US012668086B2

(12) United States Patent
Wernberg et al.

(10) Patent No.: US 12,668,086 B2
(45) Date of Patent: *Jun. 30, 2026

(54) CONVERTIBLE HANDLE

(71) Applicant: Tricam Industries, Inc., Eden Prairie, MN (US)

(72) Inventors: Benjamin M. Wernberg, Savage, MN (US); Benjamin P. Williams, Chaska, MN (US); Joseph P. Foley, St. Paul, MN (US)

(73) Assignee: Tricam Industries, LLC, Eden Prairie, MN (US)

( * ) Notice: Subject to any disclaimer, the term of this patent is extended or adjusted under 35 U.S.C. 154(b) by 924 days.

This patent is subject to a terminal disclaimer.

(21) Appl. No.: 17/870,252

(22) Filed: Jul. 21, 2022

(65) Prior Publication Data

US 2022/0355634 A1 Nov. 10, 2022

Related U.S. Application Data

(62) Division of application No. 16/266,766, filed on Feb. 4, 2019, now Pat. No. 11,505,020.

(51) Int. Cl.
B60D 1/54 (2006.01)
B60D 1/145 (2006.01)
B62B 5/00 (2006.01)

(52) U.S. Cl.
CPC .............. B60D 1/54 (2013.01); B60D 1/145 (2013.01); B62B 5/0079 (2013.01)

(58) Field of Classification Search
CPC . B60D 1/54; B60D 1/48; B60D 1/145; B60D 1/155; B62B 5/0079; B62B 5/06; B62B 5/067; B62B 5/066; B62B 1/008; B62B 1/24

See application file for complete search history.

(56) References Cited

U.S. PATENT DOCUMENTS

| | | | | |
|---|---|---|---|---|
| 3,231,309 A * | 1/1966 | Talbert | ..................... | B60P 1/18 298/17.5 |
| 4,645,224 A * | 2/1987 | Poganski | ................. | B60D 1/14 280/475 |
| 5,217,240 A * | 6/1993 | Gardenhour, Jr. | ....... | B62H 7/00 280/282 |
| 5,941,585 A * | 8/1999 | McAlister, II | ........... | B60D 1/14 280/47.17 |
| 6,662,679 B2 * | 12/2003 | Hobdy | ..................... | B60D 1/14 74/548 |
| 7,134,681 B1 * | 11/2006 | Jones | ........................ | B62B 5/06 280/651 |
| 7,210,697 B2 * | 5/2007 | Simpson | ................... | B62B 5/06 16/446 |
| 7,350,790 B1 * | 4/2008 | Wilson | ..................... | B60D 1/00 280/47.131 |

(Continued)

FOREIGN PATENT DOCUMENTS

CA 2412458 A1 * 5/2003

*Primary Examiner* — William L Miller

(57) ABSTRACT

A convertible handle having a shaft portion and a grip portion. The grip portion is configured to slide along the length the shaft portion to expose a tongue on the shaft portion. In a manual configuration, the grip portion is used for manually pulling a cart. When not in the manual configuration, the shaft may be attached to a vehicle via the tongue for towing by vehicle.

9 Claims, 13 Drawing Sheets

(56) References Cited

U.S. PATENT DOCUMENTS

| | | | | | |
|---|---|---|---|---|---|
| 7,441,792 | B2 * | 10/2008 | Simpson | ................... | B62B 5/06 |
| | | | | | 16/446 |
| 7,658,390 | B2 * | 2/2010 | Martin | ...................... | B62B 5/06 |
| | | | | | 16/422 |
| 8,011,707 | B1 * | 9/2011 | Summers | ............... | A47C 1/124 |
| | | | | | 280/47.35 |
| 8,844,949 | B2 * | 9/2014 | White | ..................... | B62B 5/067 |
| | | | | | 280/646 |
| 9,156,319 | B1 * | 10/2015 | Kennemer | ............. | B60D 1/145 |
| 9,452,767 | B2 * | 9/2016 | Falcaro | .................... | B62B 5/067 |
| 10,029,523 | B2 * | 7/2018 | Pederson | .............. | B60D 1/025 |
| 10,046,784 | B2 * | 8/2018 | Rackleff | ................ | B60D 1/58 |
| 10,106,184 | B2 * | 10/2018 | Johnson | ............... | B62B 3/1404 |
| 10,507,857 | B2 * | 12/2019 | Bowman | .............. | B62B 3/1468 |
| 11,738,789 | B2 * | 8/2023 | Feick | ...................... | B62B 1/206 |
| | | | | | 280/47.31 |
| D1,000,246 | S * | 10/2023 | Aguiar | ......................... | D23/206 |
| 11,851,266 | B2 * | 12/2023 | Schmitt | .................. | B65D 85/48 |
| 12,005,948 | B2 * | 6/2024 | Bornemann | ........... | B62B 5/064 |
| 12,030,545 | B2 * | 7/2024 | Wernberg | .............. | B62B 5/067 |

| | | | | | |
|---|---|---|---|---|---|
| 2003/0218305 | A1 * | 11/2003 | Nicolay | ................... | B62B 5/06 |
| | | | | | 280/47.315 |
| 2006/0091629 | A1 * | 5/2006 | Wiesendanger | ..... | B62D 63/064 |
| | | | | | 280/47.131 |
| 2006/0131835 | A1 * | 6/2006 | Simpson | ................... | B62B 5/06 |
| | | | | | 280/415.1 |
| 2006/0261577 | A1 * | 11/2006 | Jones | ...................... | B60D 1/52 |
| | | | | | 280/651 |
| 2008/0106053 | A1 * | 5/2008 | Tsai | .......................... | B62B 5/06 |
| | | | | | 280/47.315 |
| 2008/0296866 | A1 * | 12/2008 | Martin | ...................... | B62B 5/06 |
| | | | | | 280/304.5 |
| 2009/0115163 | A1 * | 5/2009 | Winter | ..................... | B62B 5/06 |
| | | | | | 280/418.1 |
| 2010/0263476 | A1 * | 10/2010 | Peschmann | ........... | G05G 1/085 |
| | | | | | 74/546 |
| 2015/0054241 | A1 * | 2/2015 | Wierszewski | ............. | B62B 5/06 |
| | | | | | 280/47.31 |
| 2017/0267299 | A1 * | 9/2017 | Nielsen | ................... | B60S 13/00 |
| 2020/0247447 | A1 * | 8/2020 | Foley | ..................... | B62B 3/007 |
| 2022/0306179 | A1 * | 9/2022 | Wernberg | ................ | B62B 1/24 |
| 2024/0109574 | A1 * | 4/2024 | Liu | ......................... | B62B 3/007 |

* cited by examiner

CONVERTIBLE HANDLE

RELATED APPLICATION

This application is a division of application Ser. No. 16/266,766, filed Feb. 4, 2019, entitled "Convertible Handle," which is hereby fully incorporated herein by reference.

TECHNICAL FIELD

The present invention generally pertains to a convertible handle. More specifically, the present invention pertains to a convertible handle that enables a cart or wagon to be pulled manually or towed by attachment to a vehicle.

BACKGROUND

It is common to attach a towed vehicle such as a cart or trailer to a towing vehicle by use of a rigid member with an articulating connection at the points of attachment to the vehicles. Many methods are used for making the attachment. For example, heavy trailers are often connected with the pintle arrangement discussed in U.S. Pat. No. 5,941,585. Lighter trailers for highway use are often connected with a ball and hitch apparatus as shown U.S. Pat. No. 4,645,224.

For still lighter towed carts or wagons, however, the connection is often simpler. Light utility trailers for off-highway use, such as a cart or wagon for a garden tractor for example, are often connected with a simple pin connection. For instance, the pin connection can take the form of a rigid tongue member connected at one end to the towed cart or trailer and having a hitch consisting of a clevis at the other end. The clevis has a hole or aperture through each branch of the clevis. The towing vehicle is provided with a projecting tab at its rear side also having a hole or aperture through it. When the clevis end of the tongue is mated with the tab projecting from the towing vehicle, the holes can be aligned and a pin inserted to couple the cart or wagon to the towing vehicle.

Tight maneuvering, especially backing, of a towed cart or wagon while connected to the towing vehicle is often difficult. Also, it is sometimes desirable to move a towed cart or wagon in places where the towing vehicle cannot go. Accordingly, it is sometimes necessary to manually pull and maneuver a towed cart or wagon. The apparatus used for connecting the tongue of the towed cart or wagon to the towing vehicle, however, is normally not conducive to gripping with the human hand. For that reason, various apparatus have been designed over time to provide detachable handles for use with a tongue of a towed vehicle.

For pintle towed trailers, the handle described in U.S. Pat. No. 5,941,585 attaches to the pintle ring, allowing two persons to lift the tongue and maneuver the trailer. This device, however, is suitable only for pintle type connections.

For lighter trailers using a ball and hitch, the handle of U.S. Pat. No. 4,645,224 can be attached to the tongue member, allowing one or two persons to lift and maneuver the trailer. The spring-loaded, twist-locking arrangement of this apparatus, however, requires the tongue member to have a somewhat large cross-section to accommodate the apparatus. Towed vehicles light enough to use a pin-connection type hitch generally do not use a tongue having a large cross section. Accordingly, such a handle is usually not suitable for use with a lighter towed vehicle.

A convertible handle of U.S. Pat. Nos. 7,210,697 and 7,441,792 utilizes rotatable handle and tongue portions that allow a user to switch from manually pulling a trailer to attaching a trailer to a towing vehicle. While such a handle addressed the need to switch between manual and powered movement of a trailer, the device was bulky, heavy, complex to manufacture, and was comprised of several parts.

What is needed is a simpler, less expensive convertible handle that can be used with the tongue of a towed vehicle. The present disclosure addresses these concerns.

SUMMARY OF THE DISCLOSURE

The present invention substantially meets the aforementioned needs of the industry. The cart includes a handle that is readily convertible from a disposition presenting a handle, preferably with a grip, that may be readily grasped by a user for manually pulling the cart to a disposition presenting a tongue for the ready coupling of the cart to a vehicle. Such a convertible handle greatly enhances the utility of the cart as compared to known methods, being both readily manually and vehicle towed, as desired. Additionally, there are only a few components that enable both manual and vehicle towing with no component requiring separate storage in either of the towing configurations while significantly reducing the complexity and cost of manufacturing.

The present invention is a convertible handle having a grip portion; the grip portion is axially slideable along the shaft of the convertible handle from a first end towards a second end. The grip portion can be locked at the first end to allow for manual pulling of a cart or wagon attached at the second end. When the grip portion is unlocked from the first end, it can be slid toward the second end, exposing a tongue that can be connected to a towing vehicle while the grip portion remains on the shaft.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
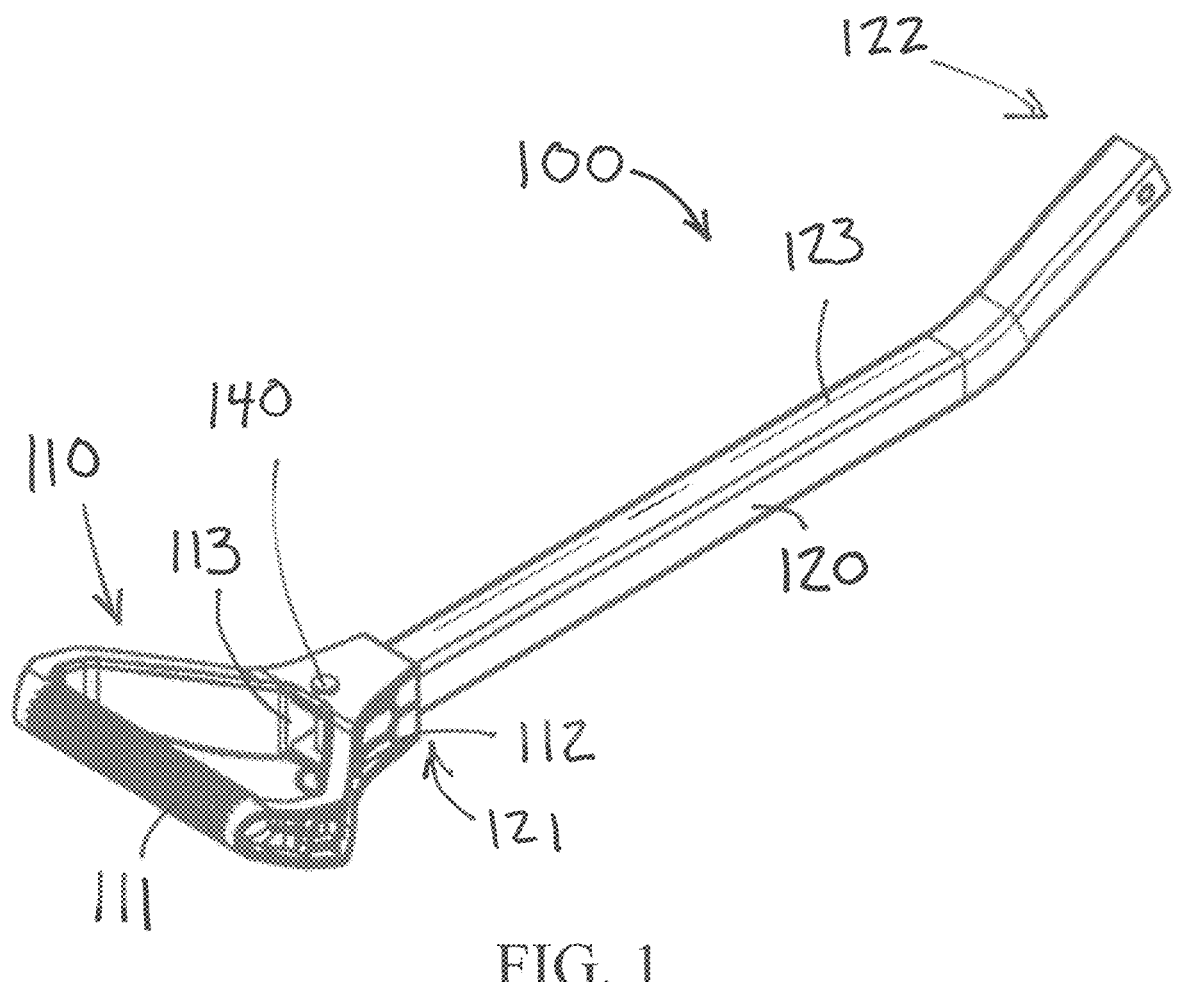
FIG. 1 is a top perspective view depicting a convertible handle in accordance with an embodiment of the disclosure in a manual configuration.
Figure 2:
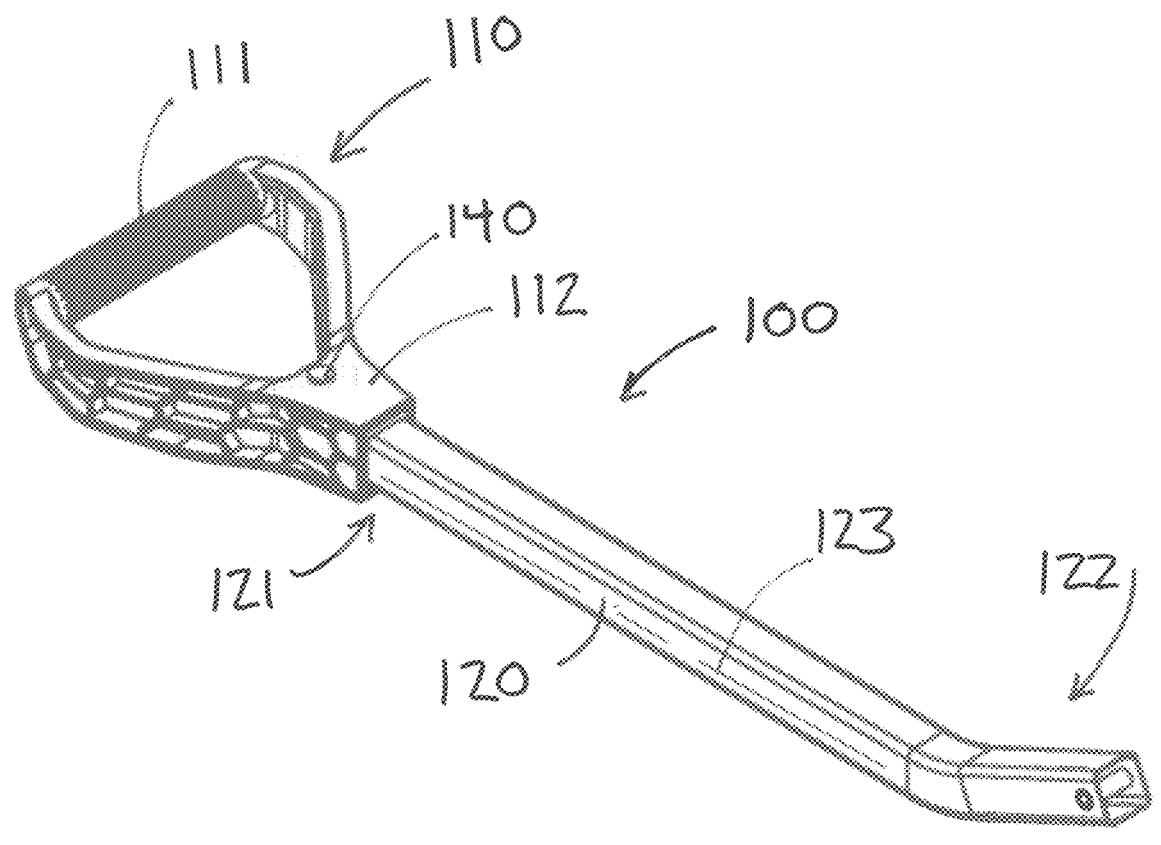
FIG. 2 is a rotated top perspective view depicting the convertible handle of FIG. 1 in a manual configuration.
Figure 3:
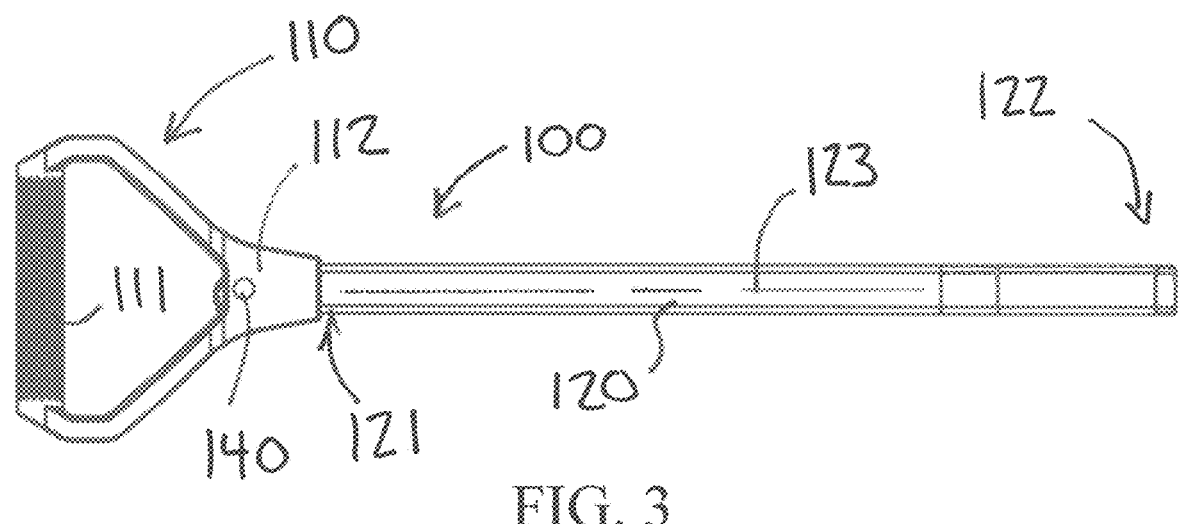
FIG. 3 is a top view depicting the convertible handle of FIG. 1 in a manual configuration.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIGS. 1-7, a convertible handle 100 is depicted in accordance with an embodiment of the disclosure. In the embodiment depicted in FIG. 1, the convertible handle 100 comprises a grip 110 and a shaft 120. The grip 110 is slideable along the longitudinal axis 123 of the shaft 120. The grip 110 has a handle 111 and a hub 112, through which is a grip shaft aperture 113. The grip 110 is preferably transverse to the shaft 120 and is substantially straight to provide comfort to a person manually pulling a cart or wagon using the convertible handle 100.

Figure 7:
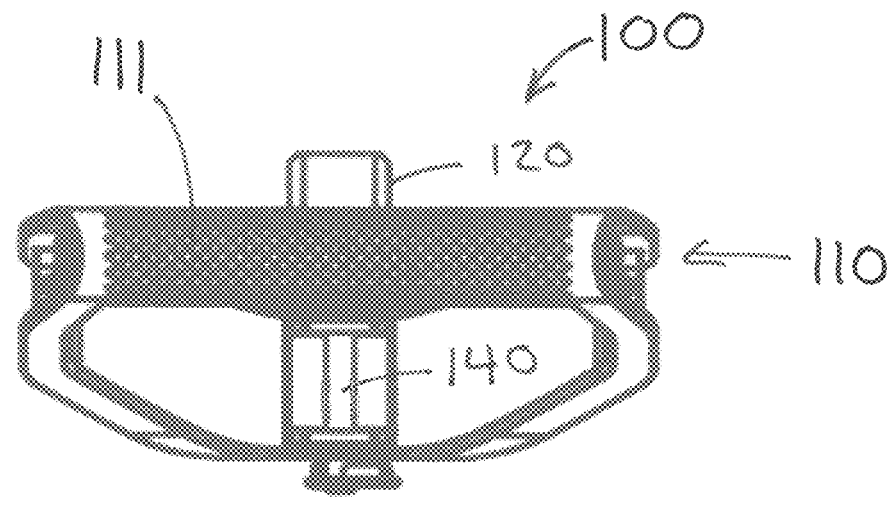
FIG. 7 is a left side elevation view depicting the convertible handle of FIG. 1 in a manual configuration.
Figure 8:
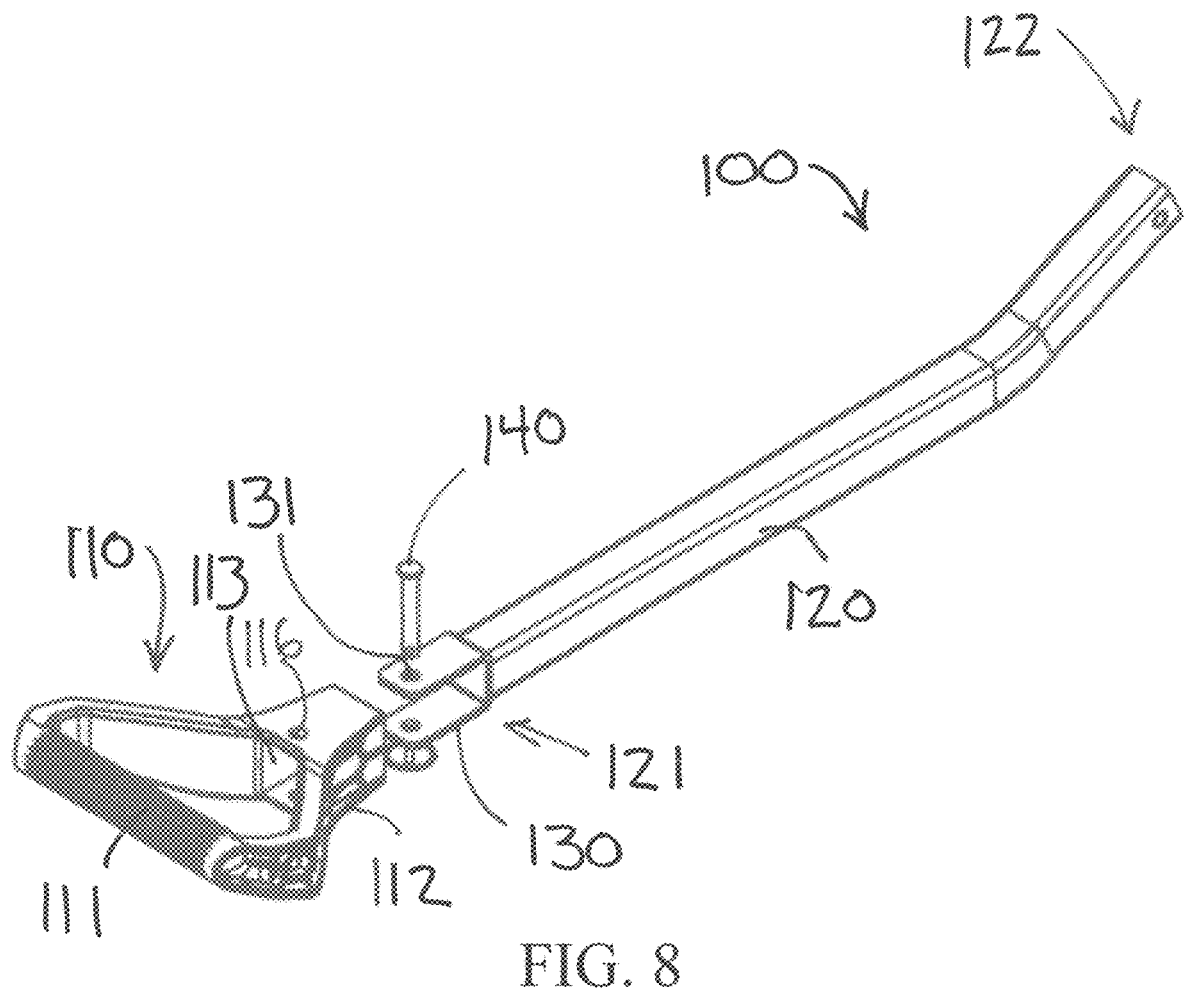
FIG. 8 is an exploded top perspective view depicting a convertible handle in accordance with an embodiment of the disclosure.

When in the configuration shown in FIGS. 1-7, the convertible handle 100 allows a user to manually pull the object to which the convertible handle 100 is attached at the shaft second end 122 by grasping the handle 111, which is retained in the shown configuration via an attachment pin 140 that is installed through grip attachment pin holes 116 aligned with tongue attachment pin holes 131 (see FIG. 8). The attachment pin 140 may be any of those common in the art, such as a t-pin, a ball lock pin, a hitch pin with cotter pin, an outrigger pin, or the like.

The grip shaft aperture 113 is sized to accommodate the outer perimeter of both the tongue 130 and shaft 120 (i.e., the grip shaft aperture inner perimeter 114 is larger than the shaft outer perimeter 124 and the tongue outer perimeter 132). The shaft outer perimeter 124 and tongue outer perimeter 132 may be identical and closer to the grip shaft aperture inner perimeter 114 to keep the grip 110 from freely moving. Alternatively, the shaft outer perimeter 124 may be smaller than the tongue outer perimeter 132 to allow the grip 110 to move freely along the shaft 120. In this arrangement the shaft second end 122 is attached to an object to be pulled (e.g., cart, wagon, trailer, etc.).

Figure 4:
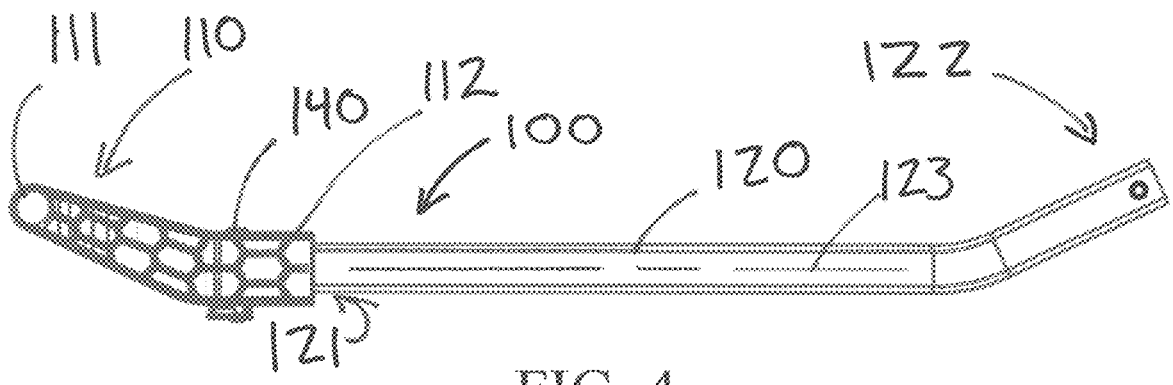
FIG. 4 is a front elevation view depicting the convertible handle of FIG. 1 in a manual configuration.
Figure 5:
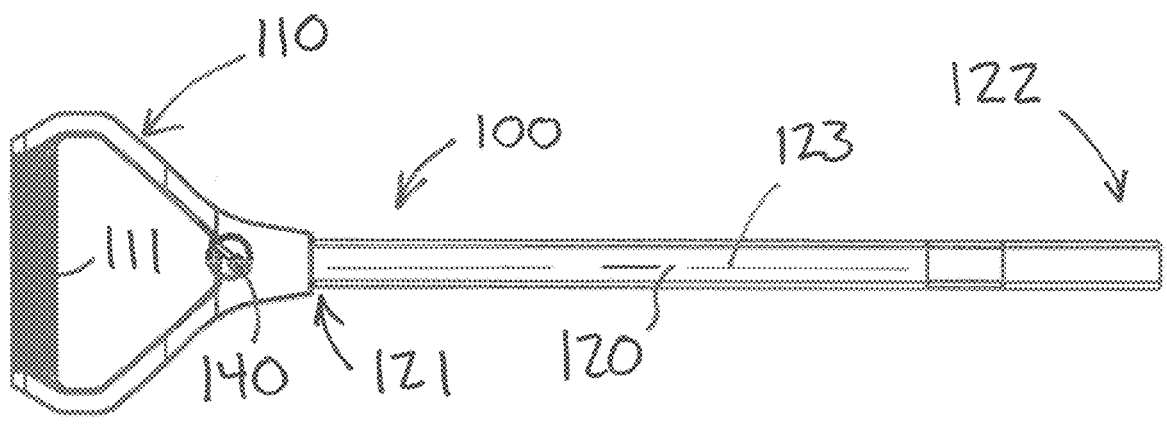
FIG. 5 is a bottom view depicting the convertible handle of FIG. 1 in a manual configuration.
Figure 6:
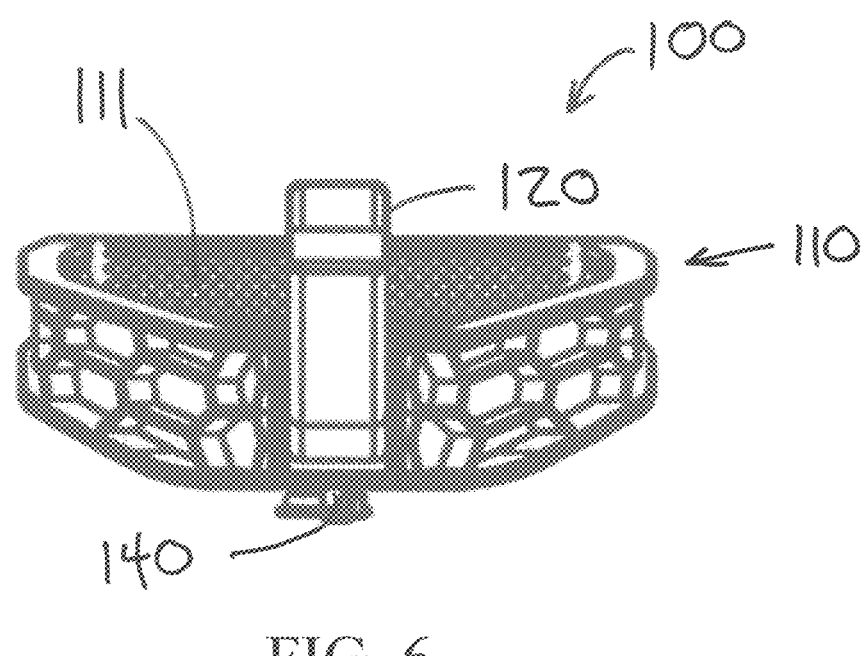
FIG. 6 is a right side elevation view depicting the convertible handle of FIG. 1 in a manual configuration.

As shown in FIGS. 4 and 7, the grip handle 111 is offset from the shaft longitudinal axis 123 so that the handle may be moved by sliding the grip 110 from the shaft first end 121 toward the shaft second end 122. This arrangement allows tongue 130 to be exposed for connection to a towing vehicle (e.g., lawn tractor, quad, etc.). As illustrated in FIGS. 15-22, the tongue 130 may be a clevis to provide stability when used in either configuration. Alternatively, the tongue 130 could have a single branch or could be more than two branches.

Figure 9:
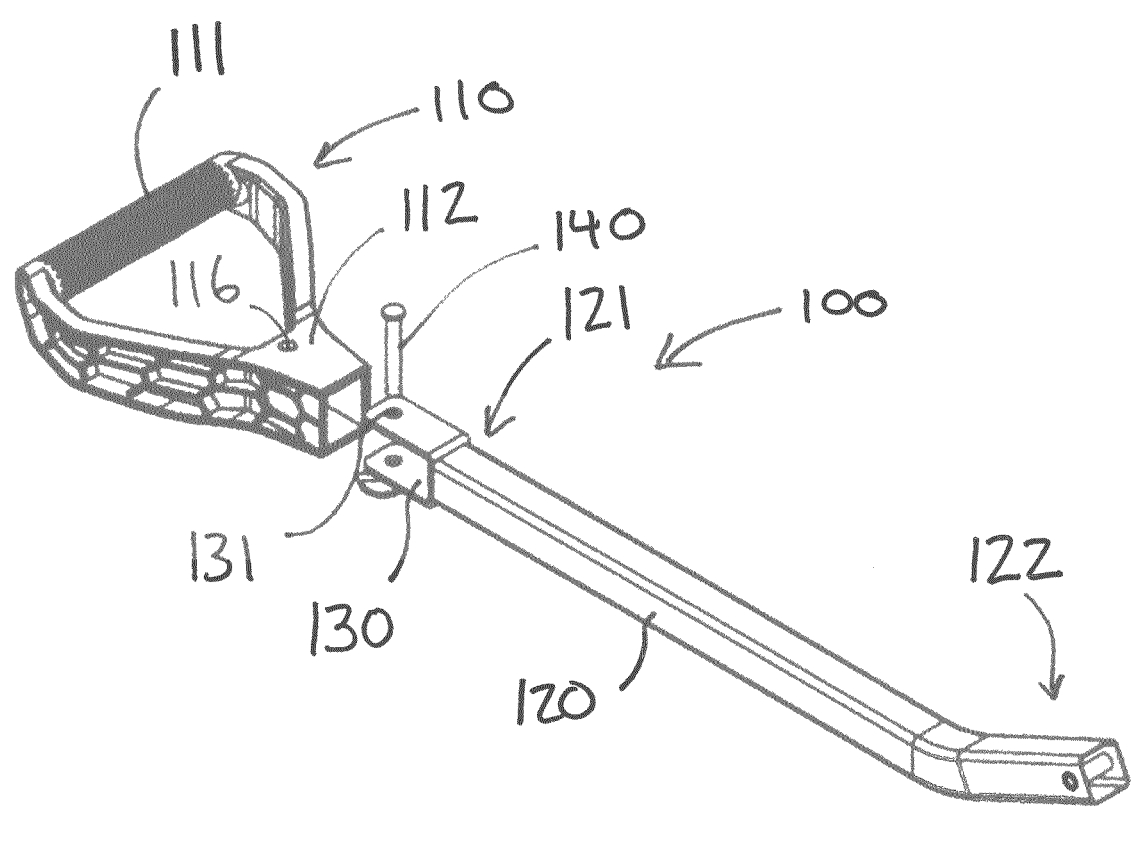
FIG. 9 is an exploded rotated top perspective view depicting the convertible handle of FIG. 1 in a manual configuration.
Figures 10, 11, 12:
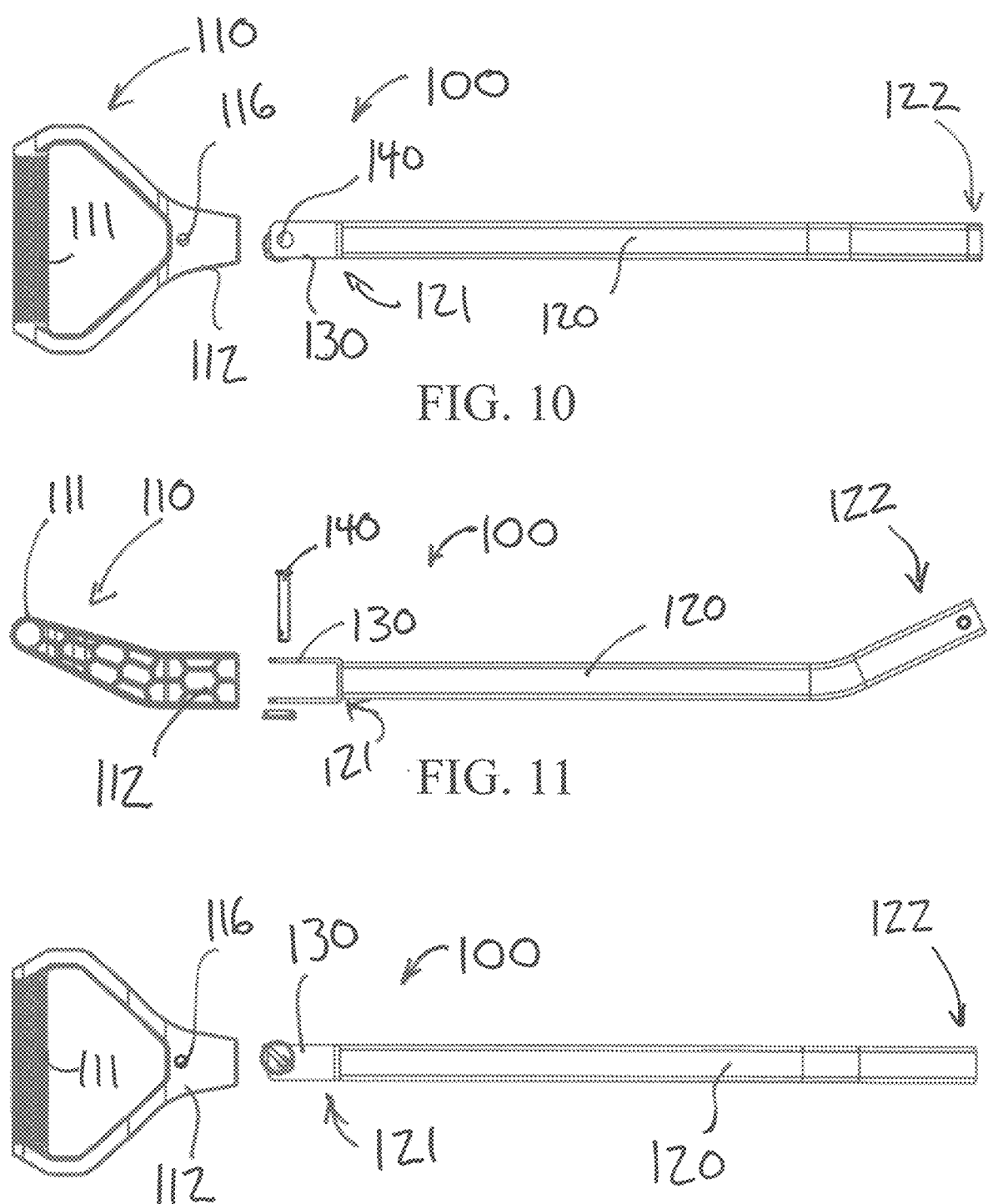
FIG. 10 is an exploded top view depicting the convertible handle of FIG. 1 in a manual configuration.
FIG. 11 is an exploded front elevation view depicting the convertible handle of FIG. 1 in a manual configuration.
FIG. 12 is an exploded bottom view depicting the convertible handle of FIG. 1 in a manual configuration.
Figure 13:
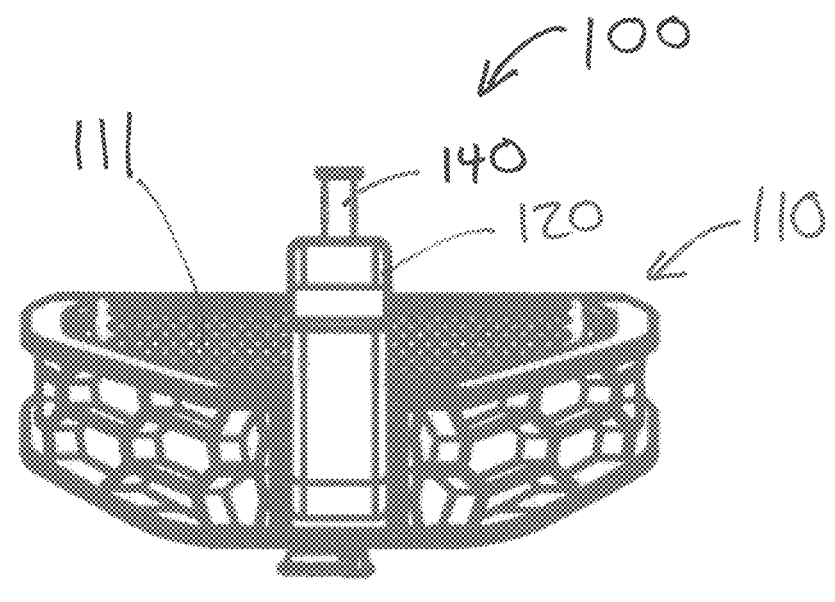
FIG. 13 is an exploded right side elevation view depicting the convertible handle of FIG. 1 in a manual configuration.
Figure 14:
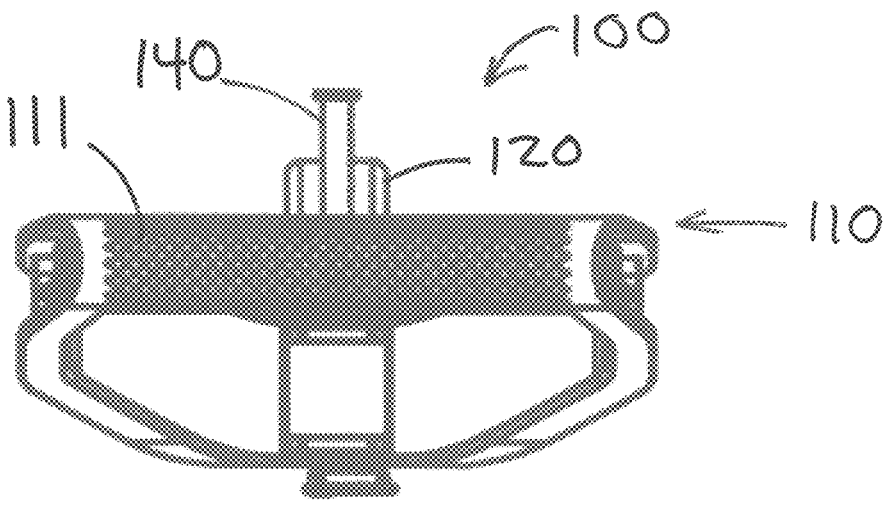
FIG. 14 is an exploded left side elevation view depicting the convertible handle of FIG. 1 in a manual configuration.
Figure 15:
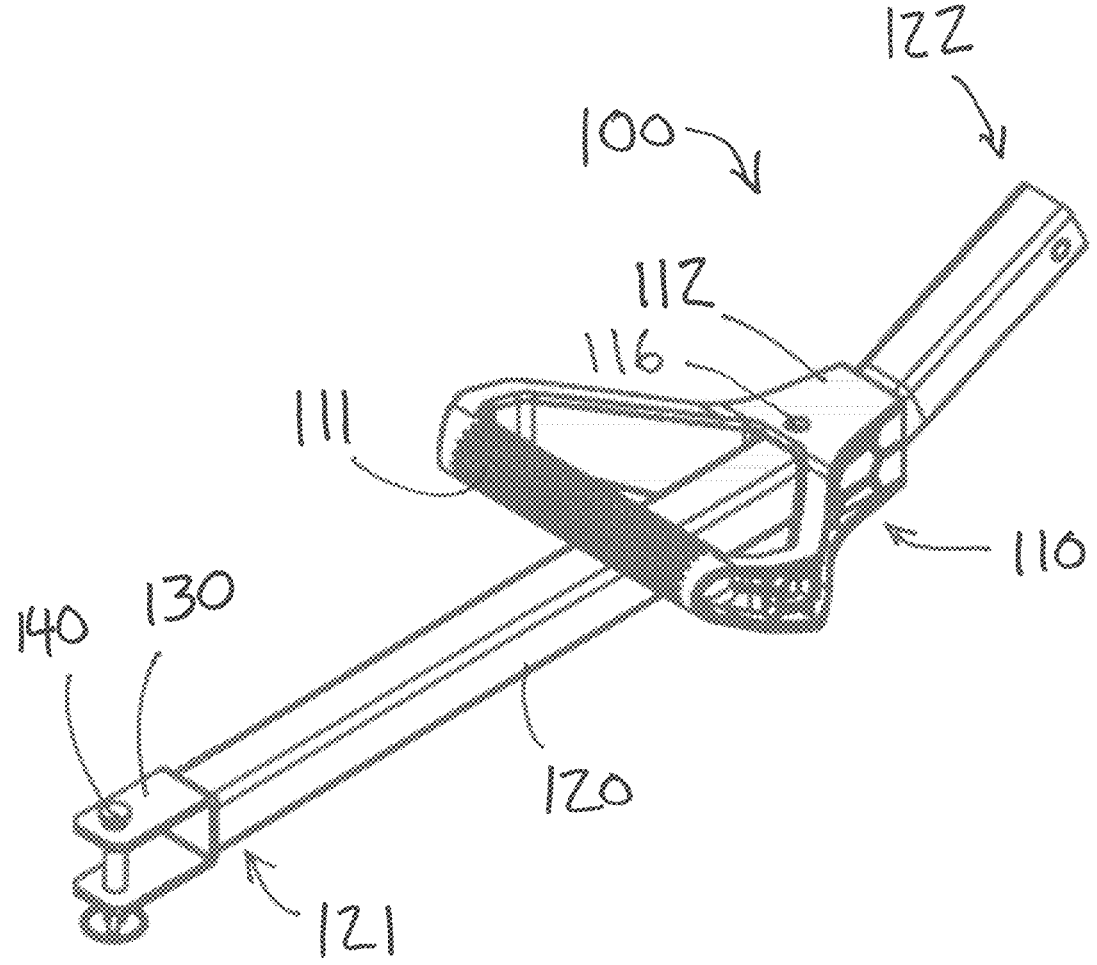
FIG. 15 is a top perspective view depicting a convertible handle in accordance with an embodiment of the disclosure in a towed configuration.
Figure 16:
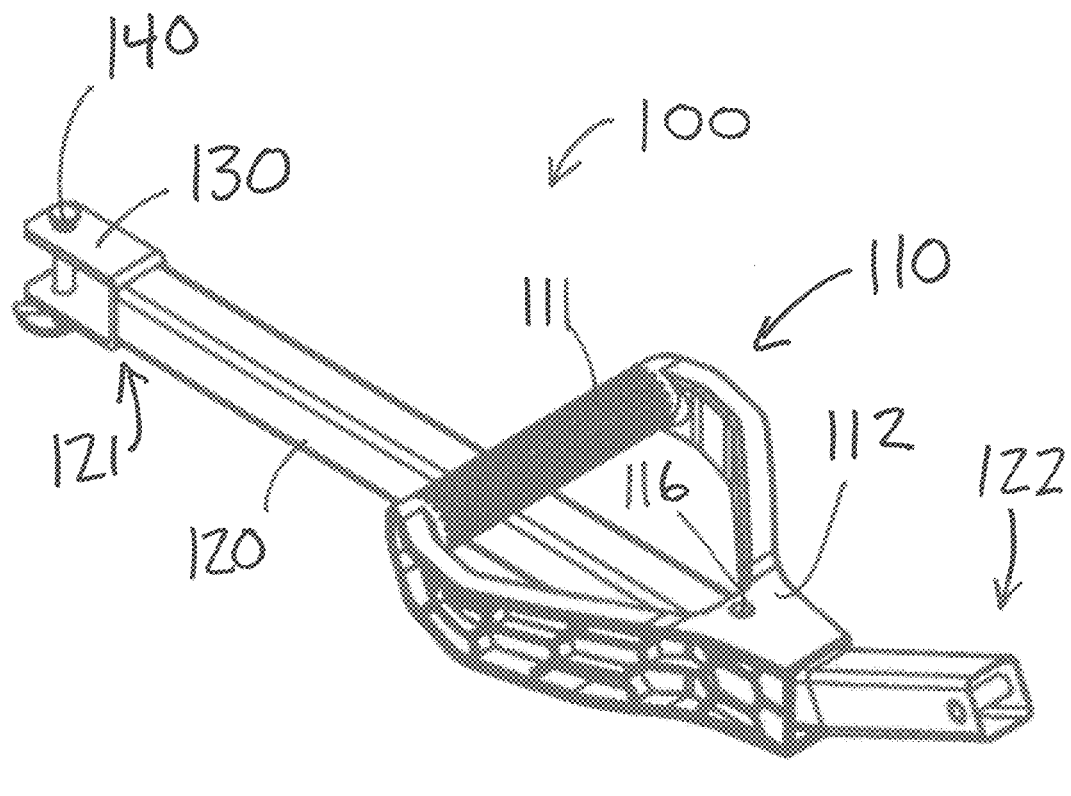
FIG. 16 is a rotated top perspective view depicting the convertible handle of FIG. 1 in a manual configuration.
Figures 17, 18, 19:
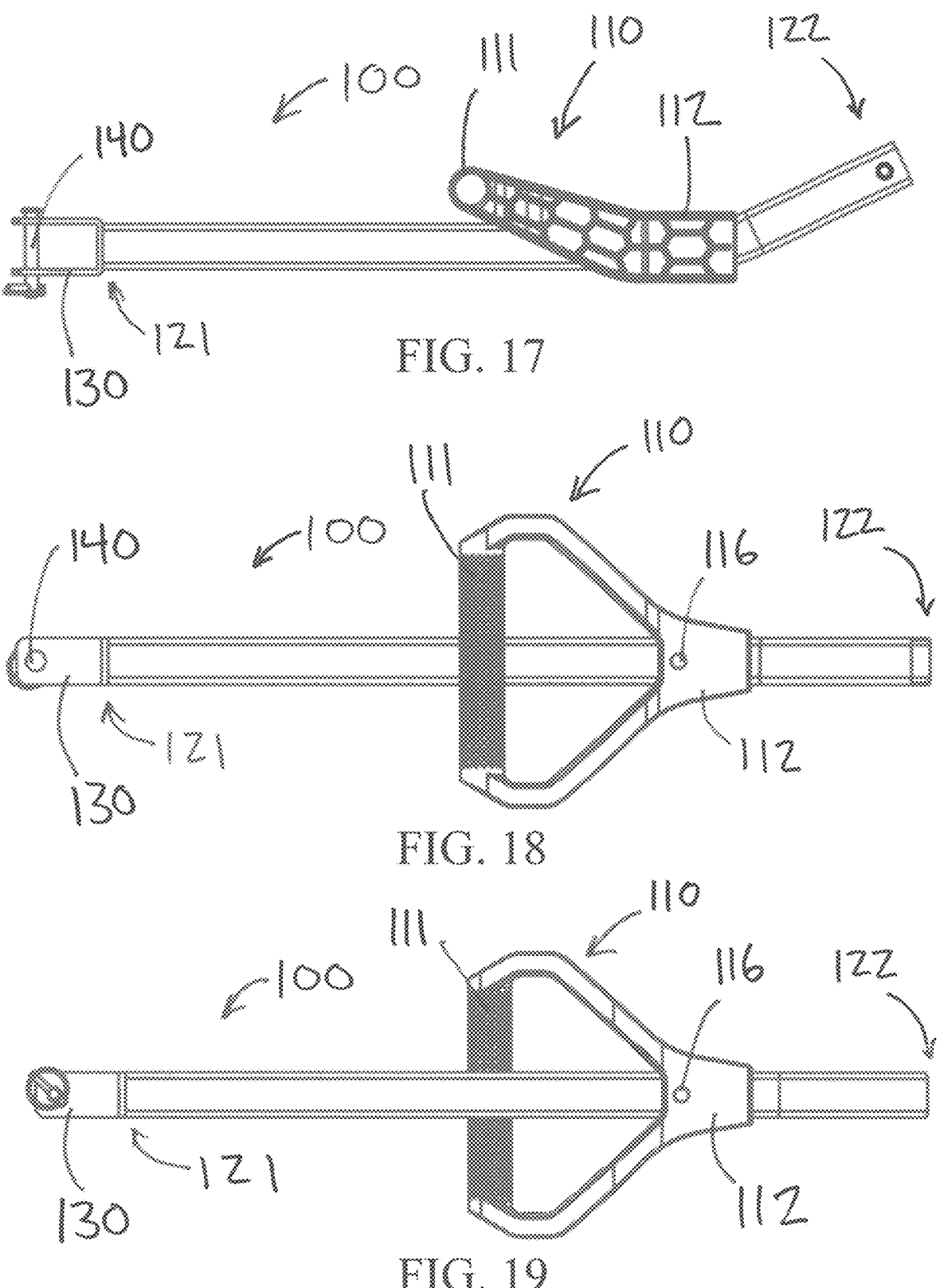
FIG. 17 is a top view depicting the convertible handle of FIG. 1 in a towed configuration.
FIG. 18 is a front elevation view depicting the convertible handle of FIG. 1 in a towed configuration.
FIG. 19 is a bottom view depicting the convertible handle of FIG. 1 in a towed configuration.
Figure 20:
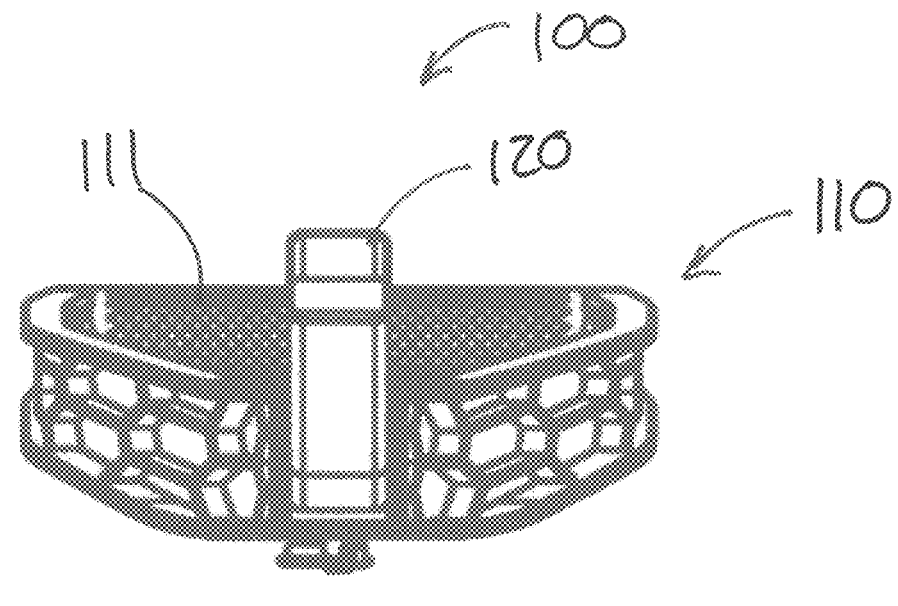
FIG. 20 is a right side elevation view depicting the convertible handle of FIG. 1 in a towed configuration.
Figure 21:
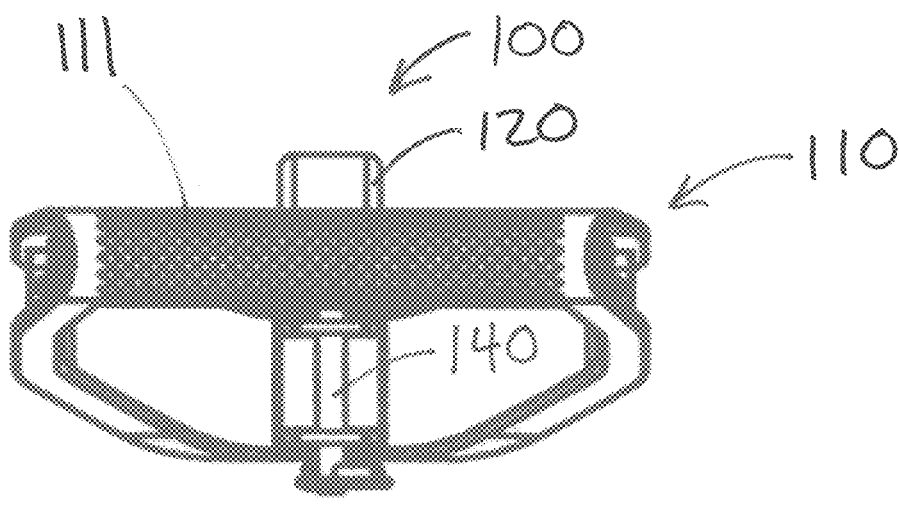
FIG. 21 is a left side elevation view depicting the convertible handle of FIG. 1 in a towed configuration.
Figure 22:
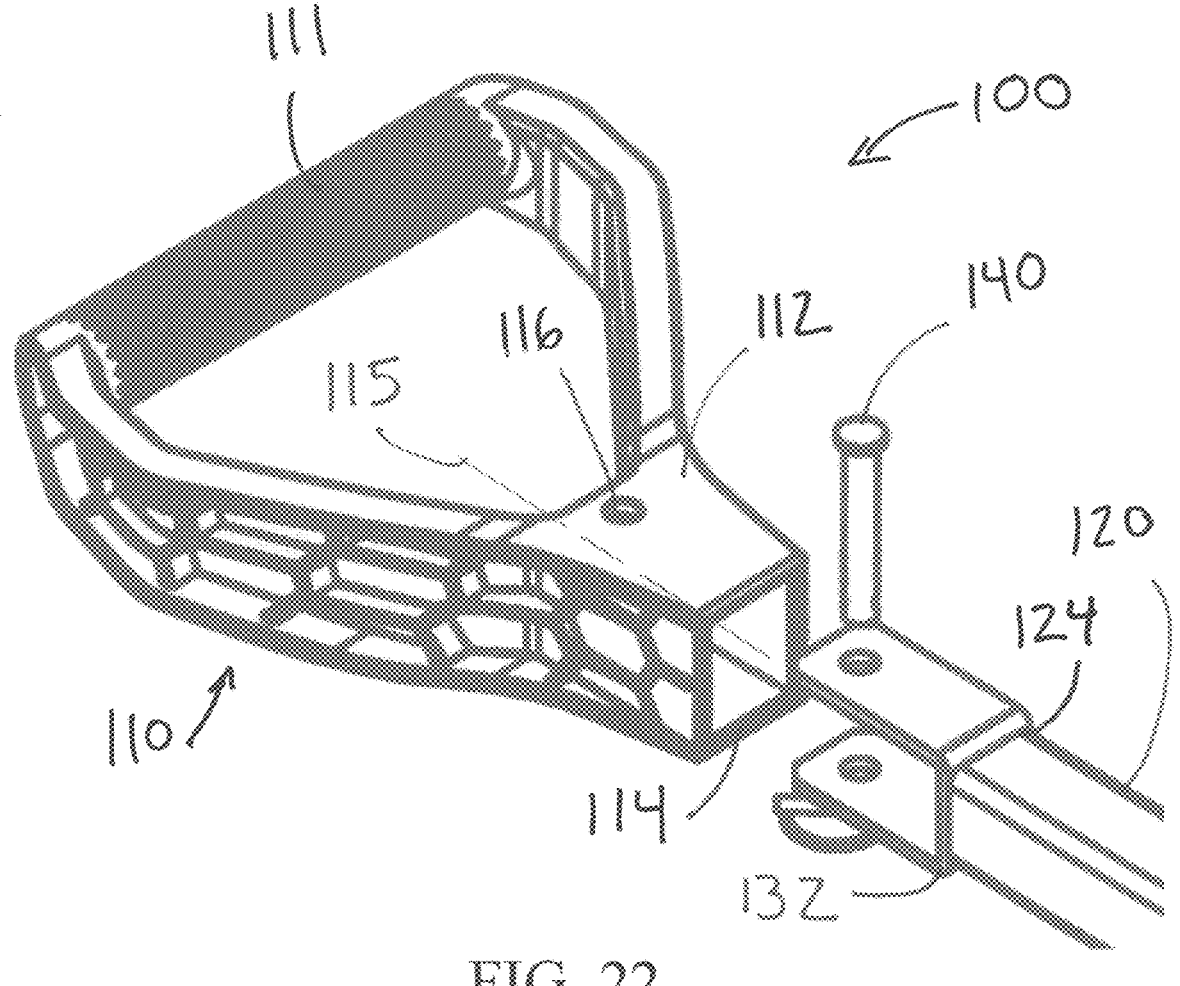
FIG. 22 is a close-up of FIG. 9 providing additional detail.

FIGS. 8-14 illustrate an embodiment of the invention in a blow-up view. As can be seen in FIG. 9, the shaft second end 122 can be configured in any way known in the art to attach convertible handle 100 to an object to be towed or pulled. FIG. 9 shows a simple pin through the shaft 120. Alternatively, a tongue 130 such as the clevis shown at the shaft first end 121 could be used. However, the means for attaching the second end to a cart can include permanent mounting (e.g., welding), bolting, press fitting, hinge, swivel, ball & hitch, receiver, or any means known in the art for coupling a trailer to a vehicle.

In the preferred embodiment, the grip 110 is not removeable from the shaft 120 to prevent loss or misplacement of the grip 110. This may be accomplished by having a stop at the proximal end of the tongue 130 that extends beyond the grip shaft aperture inner perimeter 114). The preferred embodiment has a shaft 120 and a grip shaft aperture 113 with square cross sections to keep the grip 110 aligned with the shaft 120 (as well as the grip attachment pin holes 116 aligned with the tongue attachment pin holes 131. It is contemplated that the shaft 120 and tongue 130 be made of steel to provide the most strength while the grip 110 is made of extruded plastic for light weight and user comfort.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

We claim:

1. A convertible handle for pulling or towing a cart, comprising:

a shaft having a first end, a second end, a longitudinal axis, an outer perimeter, and a tongue proximate the first end, the tongue having an outer perimeter;

a grip having a handle portion and a hub, the hub having a shaft aperture with a shaft aperture inner perimeter;

wherein the grip shaft aperture inner perimeter is sized to accommodate the shaft outer perimeter and the tongue outer perimeter; and wherein the grip is axially slideable along the shaft longitudinal axis between the shaft first end and shaft second end.

2. The convertible handle of claim 1, wherein the grip handle portion is transverse to the shaft longitudinal axis.

3. The convertible handle of claim 2 wherein the grip handle portion is offset from the shaft longitudinal axis.

4. The convertible handle of claim 3, wherein the tongue comprises an attachment pin hole and the grip hub comprises an attachment pin hole.

5. The convertible handle of claim 4, wherein the tongue attachment pin hole and the grip hub attachment pin hole are aligned to accept an attachment pin.

6. The convertible handle of claim 5, wherein the tongue attachment pin hole and the grip hub attachment pin hole are positioned so as to lock the grip at the first end of the shaft when the attachment pin is inserted into the tongue attachment pin hole and the grip hub attachment pin hole.

7. The convertible handle of claim 1 wherein the tongue comprises a clevis.

8. The convertible handle of claim 1 wherein the shaft further comprises a means for attaching the second end to the cart.

9. The convertible handle of claim 1 wherein the grip handle portion and grip hub form an uninterrupted loop.

\* \* \* \* \*